J. CORNÉLIS.
SCREW CUTTING MACHINE.
APPLICATION FILED MAY 1, 1920.
1,434,430.
Patented Nov. 7, 1922.
2 SHEETS—SHEET 1.
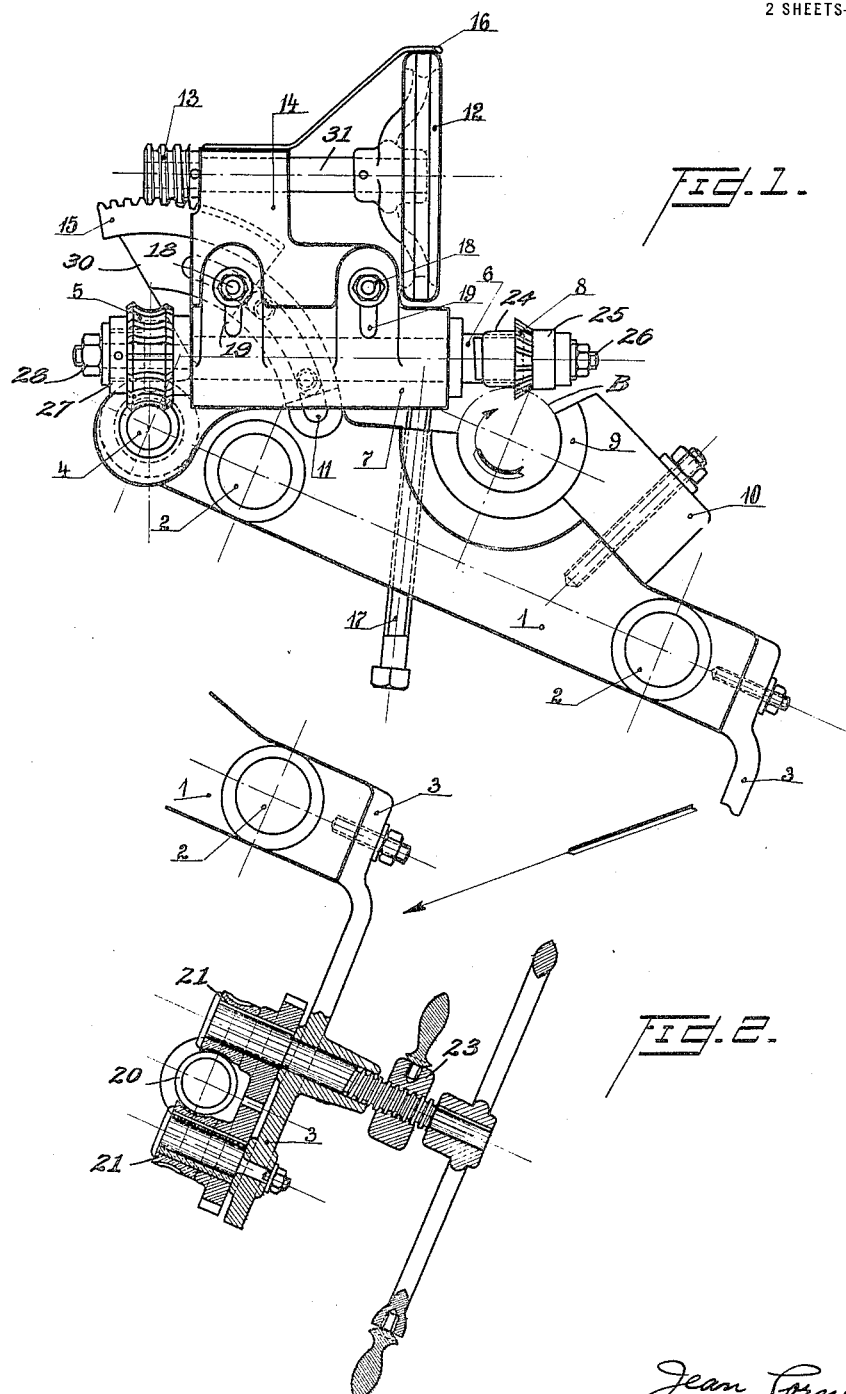
Inventor
Jean Cornélis,
By Watson, Coit, Morse & Grindle,
Att'ys J. CORNÉLIS.
SCREW CUTTING MACHINE.
APPLICATION FILED MAY 1, 1920.
1,434,430.
Patented Nov. 7, 1922.
2 SHEETS—SHEET 2.
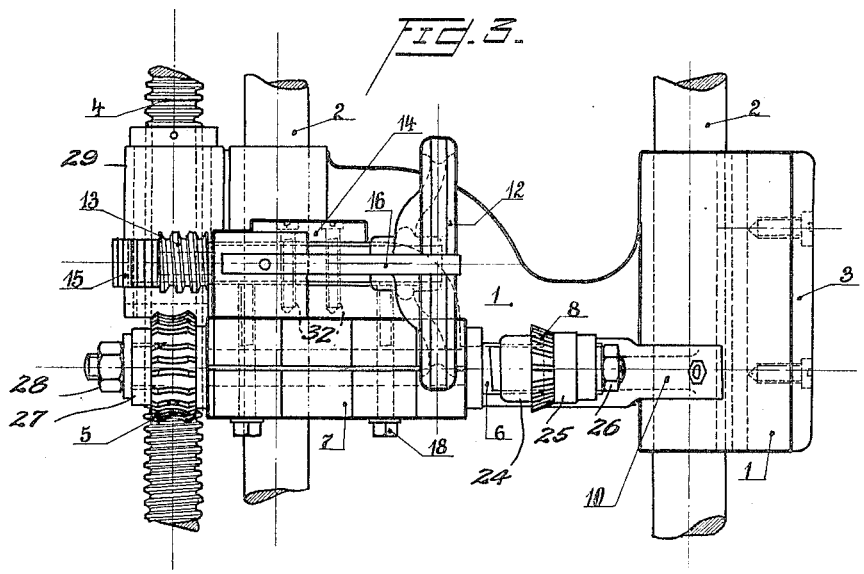
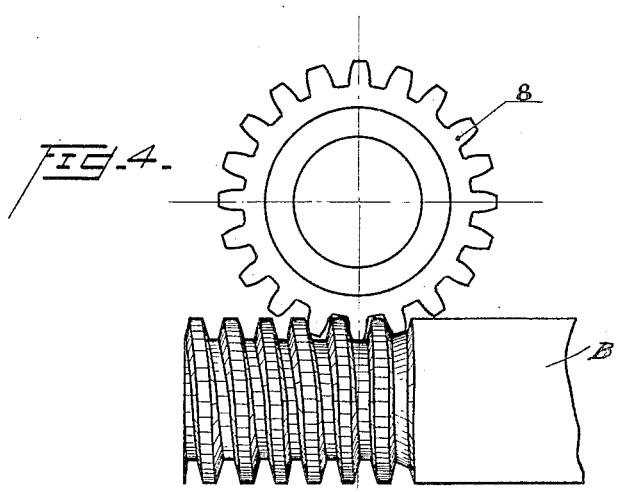
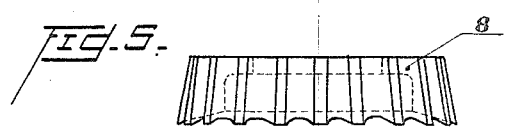

Patented Nov. 7, 1922.

1,434,430

UNITED STATES PATENT OFFICE.

JEAN CORNÉLIS, OF LIEGE, BELGIUM.

SCREW-CUTTING MACHINE.

Application filed May 1, 1920. Serial No. 378,227.

*To all whom it may concern:*

Be it known that JEAN CORNÉLIS, a subject of the King of Belgium, residing at 585 Rue St. Leonard, Liege, Belgium, has invented a new and useful Screw-Cutting Machine, of which the following is a specification.

This invention relates to screw cutting machines in which the tool is advanced on the work and its principal object is to provide a machine for cutting and finishing by a single operation a screw thread of any desired pitch, depth or shape. Another object is to provide a machine of great strength, and one which will operate in a perfect and regular manner, and at high speeds. Another object is to adjust and control the tool in such a manner that slack and lost motion are avoided.

Other objects will appear from the description, and the invention will best be understood by reference to the accompanying drawings in which:

Fig. 1 is an elevation of a device constructed in accordance with my invention;

Fig. 2 is a view of a portion of the device shown in Figure 1 showing the feeding mechanism in section;

Fig. 3 is a plan view of the machine shown in Figure 1;

Fig. 4 is an enlarged elevation of the cutting tool and blank as seen from the left of Figure 1; and Fig. 5 is an enlarged view of the cutting tool as seen in Figure 3.

The machine comprises a carriage 1 which is supported and guided by horizontal bars or guideways 2, and is provided with an apron containing means cooperating with the feed screw for advancing the carriage. The feed screw 20 is revolved by any suitable means (not shown) and meshes with the threaded members 21, which, for automatic operation, may be prevented from rotating by the lock nut 23 and thus advance the carriage. As far as the carriage is concerned, the work or blank B to be threaded is rested in a support or bearing 9 of suitable radius of curvature clamped on the carriage by a block 10. The blank remains stationary as far as translation is concerned, but is supported and rotated about its axis by any suitable means (not shown).

The carriage is provided with a rigidly attached upright or bracket 30 which terminates in a segment of a worm wheel or rack 15 and is provided with an arcuate slot 11 whose center of curvature is the axis of the screw 4. The sleeve 7, forming the supporting bearing of the tool, as will be explained, is firmly attached by bolts 18 to a piece 14 which in turn is mounted on the upright or bracket 30. The bolts or lugs 32 pass through the slot 11 and into the piece 14 thus supporting it on the bracket 30 in such manner that its only possible movement is in rotation about the axis of 4 as a center. In the piece 14 is journaled a shaft 31 carrying a worm 13 which meshes with the rack 15. The worm 13 is rotated by the hand wheel 12 and thus provides means both for rotating the tool support about 4 and for positively locking it in any desired position.

Journaled in the sleeve or tool support 7 is the shaft 6 on one end of which the tool 8 is clamped between sleeves 24, 25 by the nut 26. The shaft 6 at its other end carries a worm wheel 5 which may be clamped in place by the sleeve 27 and nut 28. This worm wheel meshes with the driving or pattern screw 4, rotating in the sleeve 29 in the upper part of the carriage and thus drives the cutter 8. In order to facilitate replacement of the worm wheel 5 the bolts 18 which support the sleeve 7 are passed through slots 19 so that the shaft 6 may be moved away from the screw 4.

The sleeve 7 may rest on the bolt 17, threaded into and projecting from the top of the carriage 1 in order to assist in positioning the tool 8 and permit it to be removed from the work and thereafter returned to the same position. If desired, the hand wheel 12 may have a scale on its periphery and a pointer 16 may be secured to the member 14 in order to indicate the position of the tool 8 with respect to the work.

The tool 8 may be of any desired pattern or construction, and is shown for the sake of illustration as a frusto-conical hob, having projecting cutting teeth disposed as elements of the conical surface.

The method of operation is as follows:

The blank to be threaded is rested in the bearing 9 and supported by any desired means independent of the carriage and is rotated at the same speed as the pattern screw 4, in the direction indicated in Figure 1. The feed of the carriage is independent of the motion of the pattern screw, and may be at any suitable speed. The tool is lowered by the hand wheel 12 to the position effecting the desired depth of cut, the operation from this point being entirely automatic. It will be seen that under the combined influence of constant speed rotation of the blank and constant speed translation of the carriage a stationary point on the hob would describe a thread on the blank. But now rotation of the hob serves two purposes, first a given tooth is rotated by the pattern screw 4 and therefore it copies the pitch of the pattern screw; and secondly the rotation advances the tooth gradually into the blank as is shown by Figure 4. Thus a given tooth follows a portion of the thread, and bites gradually into the blank, while the next tooth takes up a continuation of the thread. When a tooth has left the blank, that portion of the thread is completely cut and finished. Hence it will be seen that the machine operates continuously and automatically to form the thread at a single cut.

For cutting threads of a different shape, a correspondingly shaped cutter is used, while the cutter, worm wheel 5 and driving screw may be changed to correspond to the pitch of the thread desired, or the cutter alone changed, the work and pattern screw being rotated at different relative speeds to cut a thread of different pitch.

For inspection of the work for any desired cause the tool may be removed from the blank by rotating the hand wheel 12. Inasmuch as the member 14 and sleeve 7 rotate about the axis of the pattern screw 4 as a center, the worm wheel 5 will remain in mesh with the pattern screw 4 and the tool will continue to be driven with respect to the work. Therefore the phase relation between the work and the tool will remain constant and the tool may be returned to the work in exactly the same position as it occupied when removed therefrom.

It will be understood that the invention is not limited to the specific details shown by way of illustration, but that modifications may be made within the scope of the appended claims.

Having thus described the invention what is claimed as new and desired to be secured by Letters Patent is:

1. In a screw cutting apparatus in combination, a carriage adapted to traverse a blank to be threaded, a shaft on the carriage, a cutting tool supported by the shaft, a worm wheel rigidly attached to the shaft, a pattern screw for rotating the worm wheel, means for rotating the shaft about the pattern screw, and means permitting removal of the shaft from the pattern screw.

2. In a screw cutting apparatus in combination, a carriage adapted to traverse a blank to be threaded, a cutting tool supported by the shaft, a worm wheel rigidly attached to the shaft, a pattern screw for rotating the worm wheel, means on the carriage for rotating the shaft about the pattern screw, and an adjustable abutment adapted to limit the movement of the shaft.

3. In a screw cutting apparatus in combination, a carriage adapted to traverse a blank to be threaded, a shaft supporting a cutting tool and a worm wheel, a pattern screw for rotating the worm wheel, a sleeve for supporting the shaft, a stud on the carriage comprising a segmental rack whose center is the axis of said pattern screw, a sleeve supporting member mounted on the stud, a worm journaled in said sleeve supporting member and meshing with said rack, and a hand wheel for rotating said worm and adapted to cause rotation of the sleeve about the pattern screw.

4. In a screw cutting machine in combination, a shaft, a support therefor, a cutting tool supported by the shaft, a worm wheel rigidly attached to the shaft, a worm for driving the worm wheel, means for rotating the shaft about the worm, and means for removing the shaft from the worm.

5. In a screw cutting machine in combination, a tool supporting shaft, a worm wheel on the shaft, a driving worm meshing with the worm wheel, a support for the shaft comprising a stationary member and a sleeve having a pin and slot connection with the stationary member, a segmental rack on the stationary member, and a worm attached to said sleeve for rotating the same about the driving worm.

In testimony whereof I have signed my name to this specification in the presence of two subscribing witnesses.

JEAN CORNÉLIS.

Witnesses:
 M. EUGÈNE LUTERN,
 JULES PATTÉ.